United States Patent [19]

Foster

[11] Patent Number: 4,555,057
[45] Date of Patent: Nov. 26, 1985

[54] HEATING AND COOLING SYSTEM MONITORING APPARATUS

[75] Inventor: James O. Foster, Falls Church, Va.

[73] Assignee: JFEC Corporation & Associates, Oakton, Va.

[21] Appl. No.: 471,930

[22] Filed: Mar. 3, 1983

[51] Int. Cl.⁴ .................................... G05D 23/00
[52] U.S. Cl. ..................................... 236/94; 62/127
[58] Field of Search ............... 62/127, 126, 125, 129, 62/130; 236/94; 340/870.16, 521, 870.17, 522, 870.09, 525

[56] References Cited

U.S. PATENT DOCUMENTS

| | | | |
|---|---|---|---|
| 3,986,560 | 10/1976 | Heath et al. | 169/28 |
| 4,387,368 | 6/1983 | Day, III et al. | 62/129 |
| 4,387,578 | 6/1983 | Paddock | 62/127 |
| 4,412,211 | 10/1983 | Lautzenheiser et al. | 340/541 |

*Primary Examiner*—Harry Tanner
*Attorney, Agent, or Firm*—Martha G. Pugh

[57] ABSTRACT

Apparatus for indicating if any one of a plurality of sensors detects a malfunction in a heating and cooling system. In response to a sensor detecting a malfunction, a local alarm coupled thereto, a common alarm coupled to all sensors, and a telephone dialing and message conveying device are activated. Signals provided by each sensor to a single coil that activates the common alarm and the dialing and message conveying device are prevented from being conveyed to a local alarm coupled to another sensor by including the coil in a rectifier bridge arrangement. If a malfunction corrects itself or is corrected, the local alarms and common alarm are switched off and reset to permit indication of a subsequent malfunction. The dialing and message conveying device, local alarms, and common alarm can be selectively inhibited. In the event of failure of a primary a.c. power source, a d.c. source is automatically activated to provide power.

6 Claims, 2 Drawing Figures

HEATING AND COOLING SYSTEM MONITORING APPARATUS

FIELD OF THE INVENTION

The present invention pertains to apparatus for monitoring various conditions in a heating and cooling system and indicating the presence of a malfunction.

BACKGROUND AND SUMMARY OF THE INVENTION

The typical heating and cooling plant in a building includes numerous pieces of equipment, the operating conditions of which must be monitored. Because of the serious consequences which may result from equipment malfunction, it has been customary for on-location personnel to be informed of system performance. Accordingly, costs in prior heating and cooling system monitoring apparatuses have been high because personnel were required at the plant site. It would thus be a significant advantage if such personnel could be notified of malfunctions at some remote location. By providing an automatic telephone dialing device that calls and plays a pre-recorded message to remotely located maintenance personnel when a malfunction occurs, the present invention achieves this advantage.

To prevent damage to equipment and loss of heating/cooling control for any considerable length of time, it is important that malfunctions be quickly indicated and identifiable so that the problem can be corrected. In addition, when a malfunction has been corrected, it is desirable to have the monitoring apparatus switch off and reset whatever malfunction alarm is activated so that further surveillance may continue. To achieve these ends, the present invention includes a local alarm coupled to each sensor and a common alarm activatable by any sensor signal. The system includes means for automatically dialing a pre-defined telephone number and conveying a pre-recorded message, when the telephone with said number is taken off-hook, the dialing and message conveying means being responsive to any malfunction from a sensor. The local alarm and common alarm are deactivated and reset automatically when a malfunction is no longer present. Also, to assure that the signal directed from one sensor to the common alarm does not feed back to activate an alarm associated with another sensor—which would adversely affect malfunction identification—a rectifier bridge is interposed between each local alarm and the common alarm to provide isolation.

For ease of repair and maintenance, it is also desirable to have a monitoring apparatus in which alarms can be selectively inhibited as desired.

The present invention is directed to achieving the above-discussed desired advantages and objects.

BRIEF DESCRIPTION OF THE DRAWINGS

FIG. I is a diagram of the present heating and cooling system monitoring apparatus.

FIG. II is a diagram showing a multiple rectifier bridge for isolating local alarms from signals that activate a common alarm.

DESCRIPTION OF THE INVENTION

Figure 1:
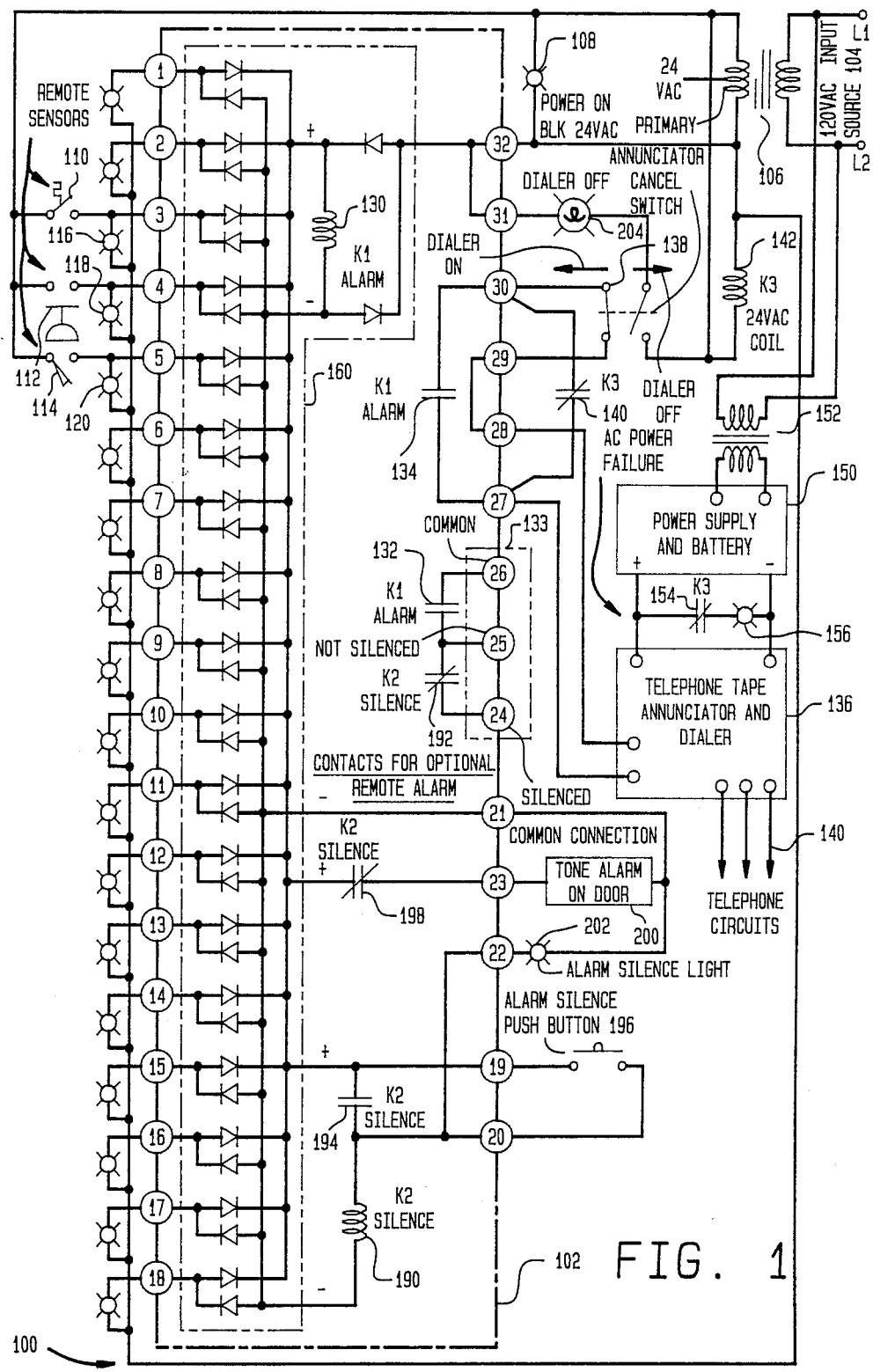
Figure 2:
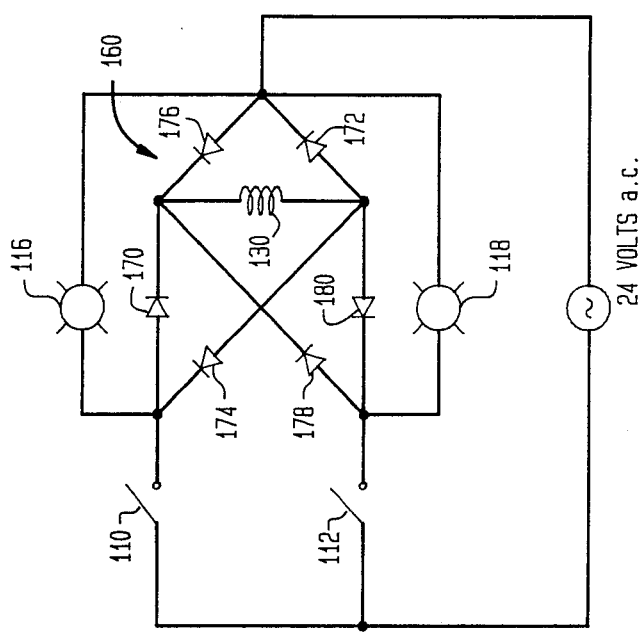

Referring to FIG. I, a heating and cooling system monitoring apparatus 100 is shown. The apparatus 100 has terminals 1 through 32 which are carried on a conventional board 102.

Power to the circuitry of the apparatus 100 is supplied by a primary a.c. source 104, which is preferably line current at 120 volts a.c. The signal is stepped down to 24 volts a.c. by a transformer 106 across the secondary of which is a "power on" indicator 108.

Each of a plurality of sensors 110, 112, 114, etc. is in series with a respective local alarm 116, 118, 120, etc., the series sensor-local alarm circuits being in parallel across the 24 volts a.c. lines. If any sensor 110, 112, or 114 assumes a closed position the 24 volt a.c. passes through the respective local alarm 116, 118 or 120 coupled thereto.

The sensors 110, 112, 114 can represent variable parameters of system operation, such as: low water in the boiler, boiler flame failure, high motor temperature in the chiller, low oil pressure in the chiller, high oil pressure in the chiller, low water pressure, low water temperature, high water temperature, condensor pump discharge pressure, and other such heating and cooling system parameters.

Significantly, each sensor 110, 112, 114 corresponds to a problem and is connected to a corresponding local alarm 116, 118, 120 which identifies the problem. Maintenance personnel can readily note the problem by examining the local alarms 116, 118, 120 which are shown to be indicator lights, for example.

Connected to receive an input from each closed sensor is a relay coil 130. Current through the coil 130 closes the contacts 132 to activate a conventional device, such as a buzzer, which serves as a common alarm 133. That is, any closed sensor (at terminal 1 through 18) will effectuate an alarm signal at the common alarm 133.

When the corresponding problem is corrected or corrects itself, the sensor 110, 112, 114 will no longer signal a malfunction condition. The local alarm 116, 118, or 120, as well as the common alarm 133, will deactivate and automatically reset because of the change in current input thereto.

Also switched by a signal through the coil 130 are contacts 134. Contacts 134 are in series with a conventional telephone tape annunciator and dialer device 136 and a manually operated dialer device switch 138. When contacts 134 are open, the dialer device 136 is not activated to dial a predefined number and transmit a pre-recorded message. When the contacts 134 are closed and the dialer device switch 138 is closed, the dialer device 136 is activated to dial and transmit the pre-recorded message via normal telephone lines 140.

A relay coil 142 keeps contacts 144 open as long as the 24 volts a.c. is supplied. When the 24 volt a.c. signal is interrupted, the contacts 144 close, thereby closing the circuit in the dialer device 136. However, a discontinuance of the 24 volt a.c. signal most probably accompanies a loss in line power at source 104. To assure the transmission of the pre-recorded message when power fails, an alternative d.c. supply 150 is included. The supply 150 is charged by a stepped down 12 volt a.c. via a transformer 152. When line power is supplied, the 12 volts a.c. is provided in rectified form to the dialer device 136. When line power stops, the battery 150 automatically continues providing the necessary power to the dialer device 136. In addition, contacts 154 close when current stops flowing through coil 142. An indicator light 156 illuminates.

In order that a signal provided by one sensor to activate the common alarm 133 and the dialer device 136 (when switched on at switch 138) not be fed back to a local alarm coupled to another sensor, a multiple rectifier bridge 160 is provided. The bridge 160 is better view in FIG. II.

In FIG. II, it can be seen that with sensor 110 closed the local alarm 116 is across the 24 volt a.c. The local alarm 116 coupled to sensor 110 will activate. In addition, the positive half cycle of the a.c. signal will pass through diode 170, the coil 130, and the diode 172. The negative half cycle will pass through diode 174, the coil 130, and the diode 176. Because of the biasing of diodes 178 and 180 associated with sensor 112 and local alarm 118, the local alarm 118 is isolated from the activating signal provided by the sensor 110. That is, the diode 178 blocks current, in the positive half cycle, from exitting the diode 170 and entering the local alarm 118 via the diode 178. As the signal passes through the coil 130, it sees a virtual short circuit through the diode 172 to again avoid the local alarm 118. A similar effect occurs during the negative half cycle of the a.c.

The common alarm 133 can be silenced by a coil 190 which switches contacts 192. It is noted that contacts 194 are also switched by the coil 190, the coil 190 and the contacts 194 forming a serial arrangement which is in parallel with coil 130. Extending parallel to the contacts 194 is a common alarm silence switch 196.

In operation, when a sensor provides a signal to the coil 130, the signal is also directed toward coil 190. If the switch 196 is closed, the coil 190 switches contacts 192 and 198 to silence, or inhibit, the common alarm 133 or another common alarm 200—either of which may be remote or local.

An alarm silence light 202 illuminates when the switch 196 is closed.

Similarly, when the dialer device 136 is inhibited, a corresponding indicator 204 is illuminated.

Maintenance personnel can therefore inspect and maintain the apparatus 100 without setting off an alarm or activating the dialer device 136. The personnel are also informed by the indicators 202 and 204 which elements are inhibited.

Other improvements, modifications and embodiments will become apparent to one of ordinary skill in the art upon review of this disclosure. Such improvements, modifications and embodiments are considered to be within the scope of this invention as defined by the following claims.

I claim:
1. Apparatus for monitoring operation of a heating and cooling system, the apparatus comprising in combination:
a plurality of sensors, each sensor constructed and arranged to detect a malfunction in a corresponding operational condition of the heating and cooling system and to provide a signal in response thereto;
local alarms, each of a plurality of said local alarms being coupled to a corresponding sensor, and constructed and arranged to be activated in response to a malfunction detection signal from said corresponding sensor;
a common alarm system including a telephone having means for dialing a predefined number and conveying a pre-recorded message on said telephone;
means for isolating each sensor from signals directed by other sensors to the common alarm system;
means responsive to any malfunction signal from one of said sensors, for automatically actuating said dialing means to call said predefined telephone number and for conveying a pre-recorded message in response to an off-hook signal received by said means immediately following said call;
wherein upon cessation of said malfunction signal, said means responsive to said malfunction signal automatically releases, resetting said common alarm system including said means for dialing a predefined number and conveying a pre-recorded message;
wherein said common alarm includes a relay coil coupled to receive the signal provided by each sensor detecting a malfunction; and
wherein the isolating means comprises:
four terminal rectifier bridge means for confining current from the primary power source to only local alarms coupled to sensors that detect malfunctions, the relay coil extending across two opposite terminals of the bridge means with alternating current from the primary power source being applied across the other two opposite terminals;
the rectifiers in the bridge means being biased so that the signal from each sensor that detects a malfunction activates the common alarm and the local alarm coupled thereto without activating a local alarm coupled to another sensor.

2. Apparatus as in claim 1 wherein the local alarms include an alarm which indicates failure of the primary power source, the source failure alarm being electrically coupled to detect primary power source failure.

3. Apparatus as in claim 1 further comprising:
first means for selectively inhibiting the dialing and message conveying means; and
second means for indicating when the dialing and message conveying means is inhibited, the second means being coupled to the first means.

4. Apparatus as in claim 3 further comprising:
third means for selectively inhibiting the common alarm from being activated; and
fourth means for indicating when the common alarm is inhibited.

5. Apparatus as in claim 1 wherein at least one of said sensors comprises a temperature sensor.

6. Apparatus as in claim 1 wherein at least one of sensors comprise temperature sensors.

* * * * *